(12) United States Patent
Stuart et al.

(10) Patent No.: US 10,343,702 B2
(45) Date of Patent: Jul. 9, 2019

(54) TECHNOLOGIES FOR CADDY ASSEMBLIES

(71) Applicant: Deflecto, LLC, Indianapolis, IN (US)

(72) Inventors: Christopher Stuart, Noblesville, IN (US); Danielle N. Rodgers, Indianapolis, IN (US); James DeChant, Carmel, IN (US); Patrick Foley, Fishers, IN (US); Cyril Bennett, Indianapolis, IN (US); Robin Wang, Foshan (CN)

(73) Assignee: DEFLECTO, LLC, Indianapolis, IN (US)

( * ) Notice: Subject to any disclaimer, the term of this patent is extended or adjusted under 35 U.S.C. 154(b) by 0 days.

(21) Appl. No.: 15/661,723

(22) Filed: Jul. 27, 2017

(65) Prior Publication Data

US 2018/0029622 A1 Feb. 1, 2018

Related U.S. Application Data

(63) Continuation-in-part of application No. 14/987,483, filed on Jan. 4, 2016.

(Continued)

(51) Int. Cl.
*B62B 3/00* (2006.01)
*B65D 71/52* (2006.01)
(Continued)

(52) U.S. Cl.
CPC .............. *B62B 3/006* (2013.01); *B25H 3/06* (2013.01); *B62B 3/002* (2013.01); *B62B 3/004* (2013.01); *B62B 3/04* (2013.01); *B62B 5/06* (2013.01); *B65D 21/0212* (2013.01); *B65D 71/0003* (2013.01)

(58) Field of Classification Search
CPC .............. B65D 25/04; B65D 25/2802; B65D 71/0003; B65D 71/0014; B65D 21/0212; B65D 21/0226; B65D 19/385; B65D 19/44; B25H 3/06; B62B 3/006; B62B 3/002; B62B 5/06; B62B 5/0093; B62B 2203/42
USPC ........ 206/560, 503, 510, 508, 501; 220/554, 220/23.86, 23.83; 280/79.2; 248/346.02
See application file for complete search history.

(56) References Cited

U.S. PATENT DOCUMENTS

| 532,324 | A | 1/1895 | Kolb |
| 3,333,730 | A | 8/1967 | Zarlinski et al. |

(Continued)

FOREIGN PATENT DOCUMENTS

DE      3702061      8/1987

OTHER PUBLICATIONS

European Search Report dated Jul. 25, 2018 in related Application No. 16735280.6 filed Jan. 5, 2016 (5 pages).

*Primary Examiner* — Robert Poon
(74) *Attorney, Agent, or Firm* — Barnes & Thornburg LLP

(57) ABSTRACT

Disclosed here is a customizable caddy assembly system including a platform base with top side and a bottom side; and a plurality of detachable wheels adapted to fit into a plurality of slots on the bottom side of the platform base. The top side of the of the platform base is capable of receiving a storage base that includes a frame, a partition dividing the frame into first and second compartments where each of the first and second compartments includes a cavity formed therein with at least an open top and the partition wall includes an upper portion extending above the level of the frame to form a handle.

21 Claims, 14 Drawing Sheets

Related U.S. Application Data

(60) Provisional application No. 62/369,661, filed on Aug. 1, 2016, provisional application No. 62/099,877, filed on Jan. 5, 2015.

(51) Int. Cl.
*B65D 21/02* (2006.01)
*B62B 5/06* (2006.01)
*B62B 3/04* (2006.01)
*B25H 3/06* (2006.01)

(56) References Cited

U.S. PATENT DOCUMENTS

| | | |
|---|---|---|
| 3,349,958 A | 10/1967 | Breneman et al. |
| 4,109,926 A * | 8/1978 | Lane ................ B62B 3/002 280/39 |
| 4,505,506 A | 3/1985 | Picozza |
| 4,714,158 A | 12/1987 | Oltman et al. |
| 5,415,277 A | 5/1995 | Berntsen |
| 5,423,445 A * | 6/1995 | Montanari ............ B65D 25/22 206/506 |
| 5,609,282 A | 3/1997 | Melanson |
| 6,607,199 B2 * | 8/2003 | Gruber ................ B62B 3/006 206/505 |
| 7,559,514 B1 | 7/2009 | Wynter |
| 8,636,169 B2 | 1/2014 | Sampaio |
| 9,969,526 B1 * | 5/2018 | Lowther ............... B65D 19/44 |
| 2002/0179462 A1 | 12/2002 | Silvers |
| 2005/0247588 A1* | 11/2005 | Hedges ................ B25H 3/00 206/373 |
| 2006/0144732 A1 | 7/2006 | Kaplan |
| 2006/0157373 A1 | 7/2006 | Griffith |
| 2006/0272556 A1* | 12/2006 | Apps ................ B65D 19/004 108/53.1 |
| 2008/0000899 A1 | 1/2008 | Baker |
| 2010/0176022 A1 | 7/2010 | Furlong |
| 2011/0005433 A1* | 1/2011 | Pichereau ............. B62B 3/04 108/55.1 |
| 2011/0061572 A1* | 3/2011 | Liu ................ B65D 19/001 108/55.5 |
| 2014/0319302 A1* | 10/2014 | Baltz ................ B65D 19/385 248/346.02 |
| 2015/0021322 A1 | 1/2015 | Rosenblum |
| 2015/0210426 A1* | 7/2015 | Funaki ................ B65D 19/385 108/53.3 |
| 2016/0130034 A1* | 5/2016 | Kuhls ................ B25H 3/023 206/510 |
| 2016/0264292 A1* | 9/2016 | Schoening ........ G06Q 10/0833 |
| 2017/0190465 A1* | 7/2017 | Nussbaum ........ B65D 19/0008 |

* cited by examiner

TECHNOLOGIES FOR CADDY ASSEMBLIES

CROSS-REFERENCE TO RELATED APPLICATIONS

This patent application is (1) a continuation-in-part of U.S. patent application Ser. No. 14/987,483 filed on Jan. 4, 2016, which claims a benefit of U.S. Provisional Patent Application 62/099,877 filed on Jan. 5, 2015, and (2) claims a benefit of U.S. Provisional Patent Application 62/369,661 filed on Aug. 1, 2016, all of which are herein fully incorporated by reference for all purposes.

TECHNICAL FIELD

The present disclosure relates to a customizable caddy assembly that includes a platform and a storage base configured to receive interchangeable storage receptacles. One or more individual container systems can be combined to create a larger organizational unit.

BACKGROUND

Storing and transporting items such as office or craft supply items can be difficult with current storage systems. This is because known storage solutions do not offer the flexibility to interchange storage receptacles or easily stack and transport more than one storage solution.

SUMMARY

Disclosed herein are storage systems including a platform supporting one or more storage bases. The assembly includes a platform having a platform base with a top side and a bottom side; and a plurality of detachable wheels adapted to fit into a plurality of slots on the bottom side of the platform base. The top side of the platform base is capable of receiving a storage base containing a frame including (i) a first horizontal side wall facing a second horizontal side wall, (ii) a first horizontal end wall facing a second horizontal end wall, the first and second horizontal end walls extending transversely between the first and second horizontal side walls, a partition extending transversely between the horizontal end walls to divide the frame into first and second compartments. The first and second compartments including (a) a planar bottom, (b) a first vertical side wall extending up from the planar bottom and terminating at a top edge, the top edge coupled to the first horizontal end wall, (c) a second vertical side wall facing the first vertical side wall extending up from the planar bottom and terminating at a top edge, the top edge coupled to the second horizontal end wall and a cavity formed within the planar bottom and vertical side walls of each compartment, each cavity at least having an open top bounded by the top edges of the horizontal end walls, the partition and one of the horizontal side walls. Further, the partition wall includes an upper portion extending above the level of the frame to form a handle, and the handle further includes (x) first handle portion pivotally attached to a first end of the handle, (y) a second handle portion pivotally attached to a second end of the handle, and (z) a groove configured to receive the handle portions therein.

In another embodiment of the disclosure, the horizontal end walls include an opening, and each handle portion has a projecting edge configured to mate with the opening within the horizontal end walls.

In another embodiment of the disclosure, the container system includes a first and second storage base, where the handle portions of the first storage base are mated with the corresponding opening within the horizontal end walls of the second storage base so as to removably connect the first storage base to the second storage base and create a storage unit.

In another embodiment of the disclosure, the horizontal side walls, horizontal end walls, partition, planar bottom and vertical end walls being integral to form a one piece, rigid base.

In another embodiment of the disclosure, the container system includes a removable receptacle configured to be received within at least a portion of the cavities, the receptacle comprising (a) a planar bottom with side walls coupled to the outward peripheral edges of the planar bottom to form a rectangular shape, and (b) a cap in substantially the same shape as the planar bottom configured to be received by the top edges of the side walls to create an enclosed receptacle.

In another embodiment of the disclosure, the container system includes a plurality of removable receptacles.

In another embodiment of the disclosure, the container system includes differently sized removable receptacles.

In another embodiment of the disclosure, planar bottoms include a receptacle connection structure comprising at least one raised portion on the upper surface of the planar bottom configured to mate with a recessed portion on the lower surface of the receptacle planar bottom, such that the receptacle removably connects to the planar bottom. A person of ordinary skill in the art would understand that this arrangement could be inverted to achieve the same result.

In another embodiment of the disclosure each planar bottom includes three receptacle connection structures evenly spaced across the planar bottom.

In another embodiment of the disclosure the cap includes a planar bottom connection structure comprising at least one recessed portion on the upper surface of the cap configured to mate with a raised portion on the lower surface of the planar bottom, such that the cap removably connects to the planar bottom. A person of ordinary skill in the art would understand that this arrangement could be inverted to achieve the same result.

In another embodiment of the disclosure each cap includes two planar bottom connection structures evenly spaced across the upper surface of the cap.

In another embodiment of the disclosure each cap includes three planar bottom connection structures evenly spaced across the upper surface of the cap.

In another embodiment of the disclosure the container system includes a first and second storage base, wherein the handle portions of the first storage base are mated with the corresponding opening within the horizontal end walls of the second storage base so as to removably connect the first storage base to the second storage base and the cap of the receptacle within the lower storage base is mated with the lower surface of the planar bottom of the second storage unit, such that first and second storage bases form a storage unit.

In another embodiment of the disclosure the first compartment and second compartment are formed so as to receive a handle of a second storage base when the second storage base is mated with the first storage base.

In another embodiment of the disclosure there is a customizable caddy assembly system. They system includes a platform base with a top side and a bottom side; and a plurality of detachable wheels adapted to fit into a plurality of slots on the bottom side of the platform base. The top side of the platform base is capable of receiving a storage base. The storage base includes (a) a frame including (i) a first horizontal side wall facing a second horizontal side wall, (ii) a first horizontal end wall facing a second horizontal end wall, the first and second horizontal end walls extending transversely between the first and second horizontal side walls (b) a partition extending transversely between the horizontal end walls to divide the frame into first and second compartments, (c) each of the first and second compartments including (i) a planar bottom, (ii) a first vertical side wall extending up from the planar bottom and terminating at a top edge, the top edge coupled to the first horizontal end wall, (iii) a second vertical side wall facing the first vertical side wall extending up from the planar bottom and terminating at a top edge, the top edge coupled to the second horizontal end wall, and (d) a cavity formed within the planar bottom and vertical side walls of each compartment, each cavity at least having an open top bounded by the top edges of the horizontal end walls, the partition and one of the horizontal side walls and a removable receptacle configured to be received within at least a portion of the cavities. The receptacle includes (x) a planar bottom with side walls coupled to the outward peripheral edges of the planar bottom to form a rectangular shape, and (y) a cap in substantially the same shape as the planar bottom configured to be received by the top edges of the side walls to create an enclosed receptacle. Further, the partition wall of the storage base includes an upper portion extending above the level of the frame to form a handle, and the handle further includes (a) first handle portion pivotally attached to a first end of the handle, (b) a second handle portion pivotally attached to a second end of the handle, and (c) a groove configured to receive the handle portions therein.

The customizable caddy assembly system can be used with or without the platform.

Numerous other aspects, features and benefits of the present disclosure may be made apparent from the following detailed description taken together with the drawing figures.

BRIEF DESCRIPTION OF DRAWINGS

The accompanying drawings, which are incorporated in and constitute a part of this specification, illustrate an implementation of the present disclosure and, together with the description, serve to explain the advantages and principles of the disclosure. In the drawings.

DETAILED DESCRIPTION

Figure 1:
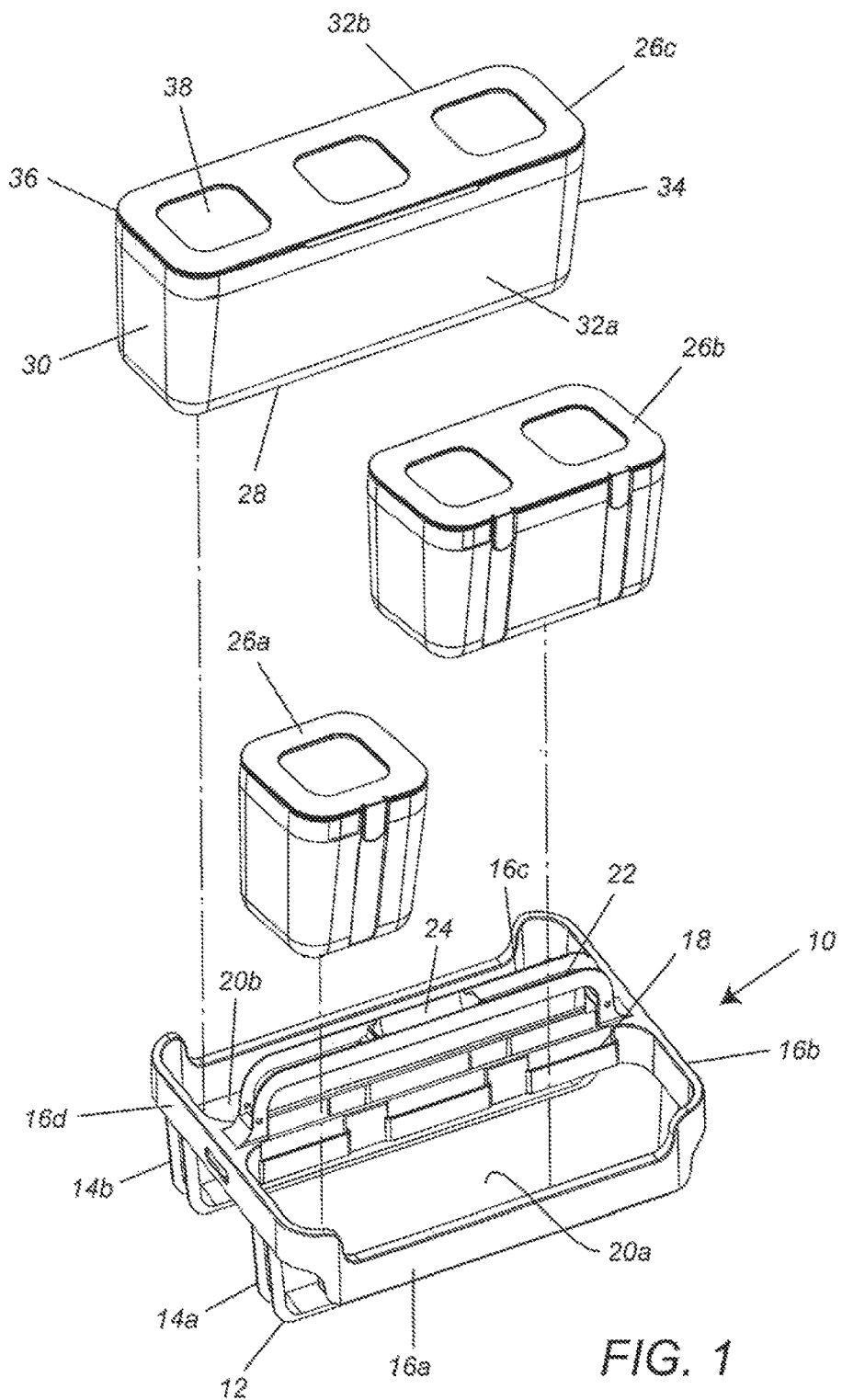
FIG. 1 depicts an exploded view of a carrying base and storage receptacles according to an embodiment of the disclosure.

As shown in FIG. 1 the container system includes a storage base portion 10. The base portion includes a planar bottom 12. The storage base portion includes a first end and a second end, each of which are coupled to a vertical side wall 14a and 14b. The vertical side wall 14 is coupled to horizontal side walls 16a, 16b, 16c and 16d, which define the internal space of the storage base portion 10. The storage base portion can assume various shapes known to persons of ordinary skill in the art by varying the length or other dimensions of the horizontal and vertical side walls, but is preferably square or rectangular in shape.

Further, as shown in FIG. 1, an interior horizontal sidewall 18 or sidewalls may be used to separate or divide the interior of the storage base portion into one or more cavities 20. In the embodiment shown in FIG. 1, the storage base portion is divided into two cavities 20a and 20b. Each cavity is defined by a planar bottom 12, vertical side walls 14 and an horizontal interior side wall 16. The planar bottom 12, vertical side walls 14 and horizontal side walls 16 and 18 can vary in dimension so as to create a more open base portion as shown or closed cavity. In other embodiments, the cavities can further be defined into smaller cavities by employing additional interiors side walls within the cavity.

A handle 22 extends from a first horizontal side wall to second horizontal side wall opposite to or facing the first horizontal sidewall. The handle is provided to allow the container system to be moved to another location by grasping a portion of the bar 24. As discussed in more detail later on, the handle portion 44 also serves to connect one container system to another.

The container system also includes one or more receptacles 26 of the same or varying sizes like those shown in 26a, 26b and 26c. The receptacles can be inserted within the storage base portion to transport the receptacles or store the receptacles. The receptacles can also be removed to access items within the receptacle or interchange them with a different receptacle. Each receptacle includes a planar bottom 28 with walls coupled to outward peripheral edges of the planar bottom 28. Specifically, the receptacle may include a first side wall 32a that is coupled to one side edge of the planar bottom 28 and a second side wall 32b is coupled to the opposite side edge of the planar bottom. Between the sidewalls is a frontwall 30 that is coupled to a front edge of the planar bottom and a backwall 34 coupled to the opposite back edge of the planar bottom. The sidewalls, planar bottom and front and back walls combine to form a receptacle with an internal storage cavity.

Included with the receptacle 26 is a cap 36 which can be attached to an upper edge of a side wall, front wall or back wall to create an enclosed receptacle. For example, the cap can be provided with one or more hinge supports equally spaced along a peripheral edge of the cap which is joined to either a side wall, front wall or back wall. In the embodiment, the cap can open by pivoting about the hinge and close by pivoting about the hinge in an opposite direction. The cap can also snap into place on top of the receptacle. Other mechanisms of attaching the cap to the receptacle well known to those of ordinary skill in the art can also be employed. Further, the upper surface of the cap 36 may include one or more recesses 38 which have a peripheral profile that corresponds to all or a portion of the planar bottom 12 of the storage base portion 10, the planar bottom 28 of a different receptacle, or both such that when one or more organization units are vertically stacked, the planar bottom 12 of the storage base portion 10, the planar bottom 28 of a different receptacle, or both nest with in all or a portion of the cap recess.

Figure 2:
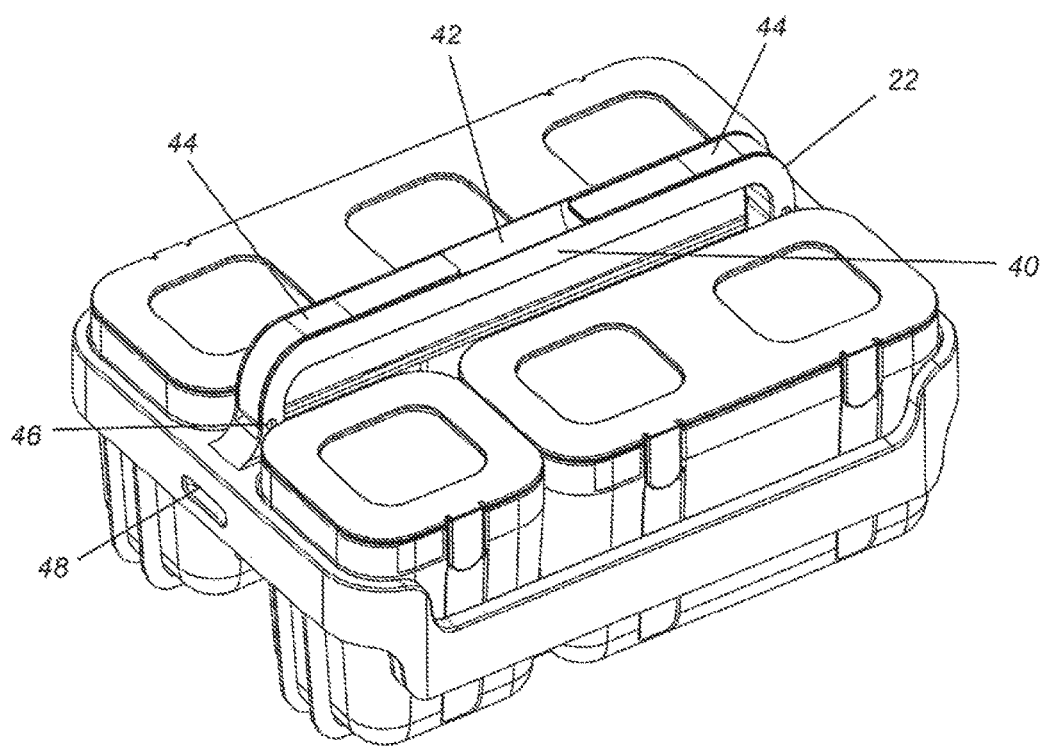
FIG. 2 depicts a view of a carrying base and storage receptacles according to an embodiment of the disclosure.

FIG. 2 is shows a more detailed view of the handle 22. The handle 22 may include a pair of handle side walls 40 facing each other forming a groove or open cavity 42 which can receive handle portion 44 that pivots about a fixed point 46 to a 90 degree or substantially 90 degree angle with respect to the handle 22. The handle portion 44 and the groove 42 are configured such that the upper surface of handle portion 44 is flush with the upper edges of the groove 42 when the handle portion is received within the groove. FIG. 2 also shows an opening 48 in horizontal side wall, which is adapted to receive the upper part of the handle portion as shown in FIGS. 3 and 4.

Figure 3:
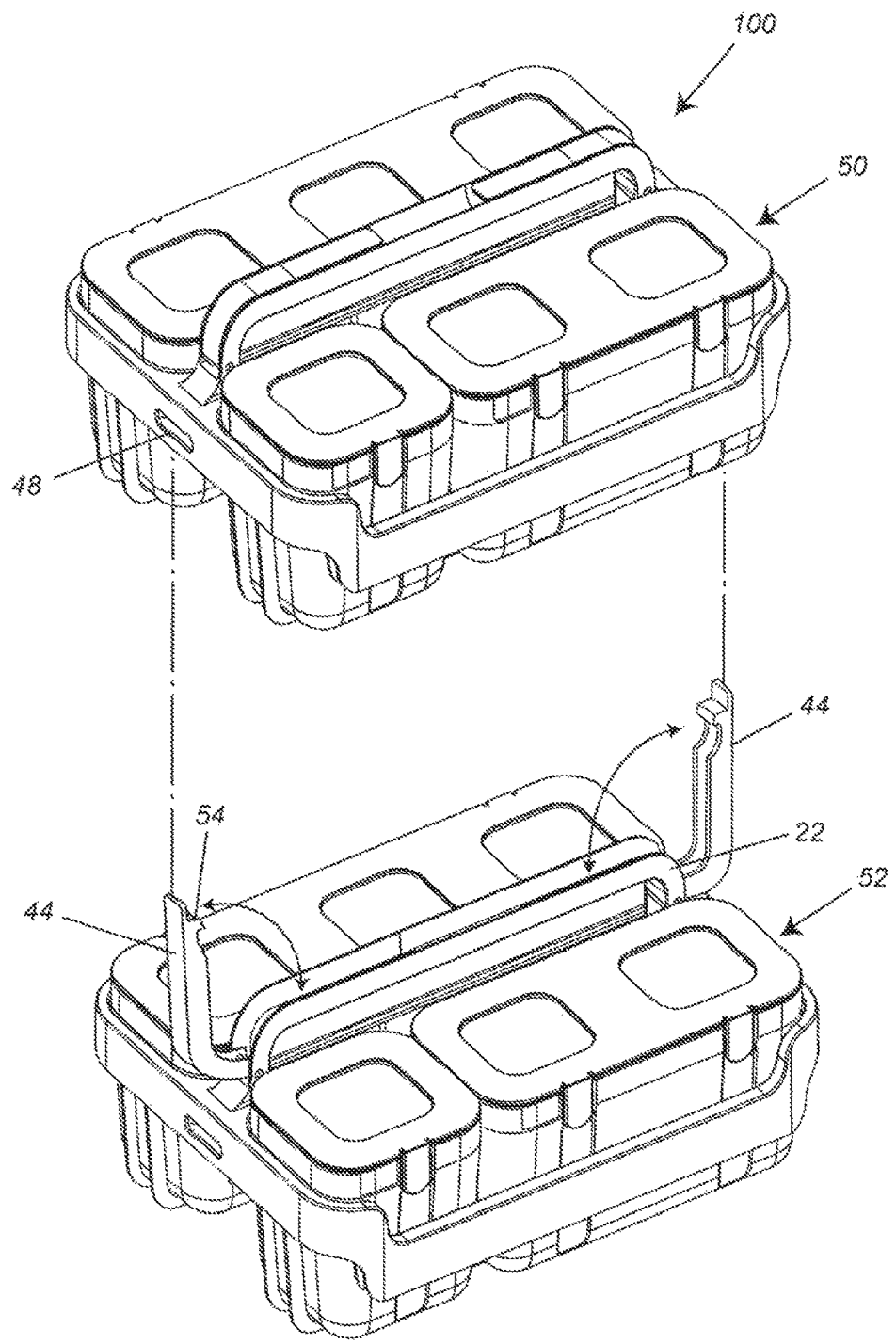
FIG. 3 depicts an exploded view of the organizational unit according to an embodiment of the disclosure.
Figure 4:
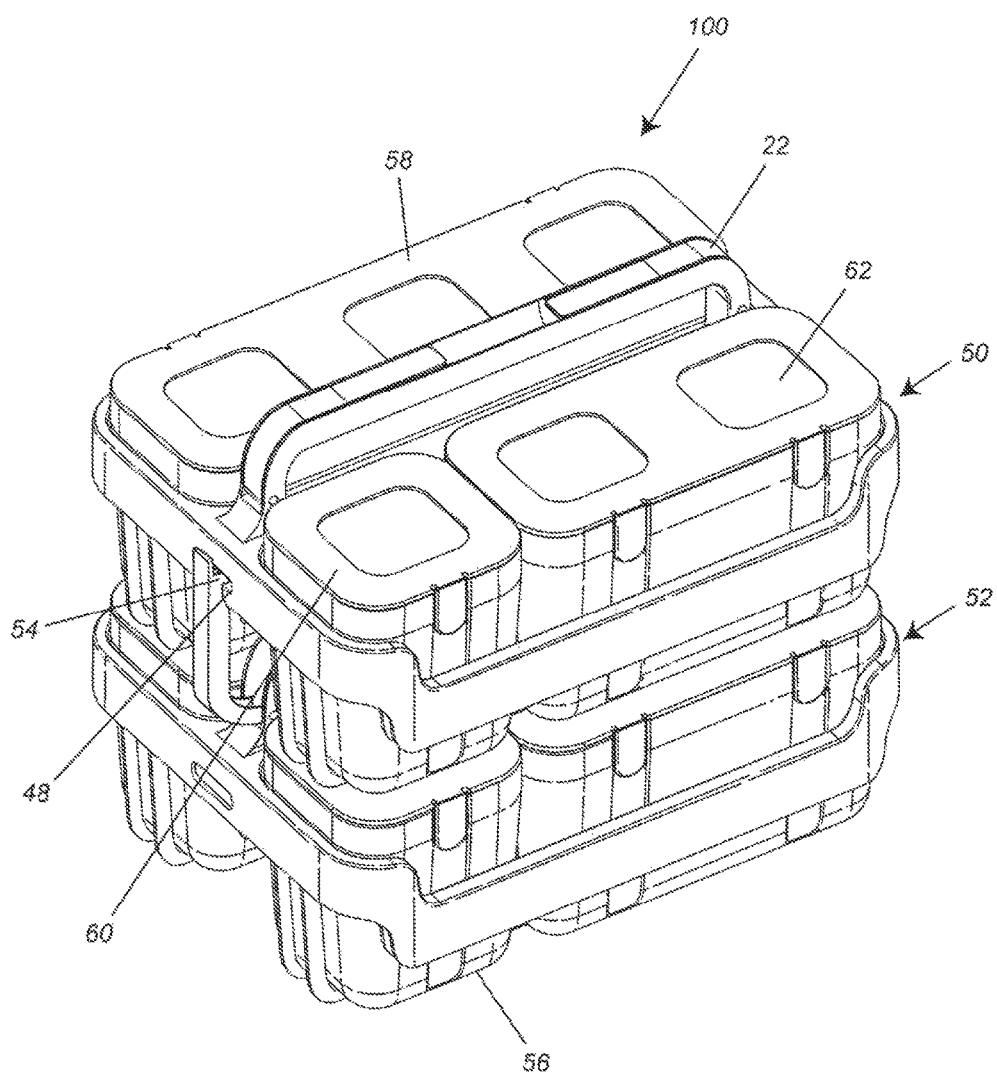
FIG. 4 depicts the organizational unit according to an embodiment of the disclosure.

FIGS. 3 and 4 show an embodiment of the disclosure where two or more container systems may be connected to each other to create an organization unit 100. Specifically, FIG. 3 shows an upper container system 50 disconnected from a lower container system 52 which allows a user to create a smaller organizational unit or to access receptacles within a lower container system 52.

In this embodiment, the handle portions 44 are extended outwardly from the handle 22 at about 90 degrees. Each handle portion has a projecting edge 54 which can be mated with the opening 48 within the horizontal side wall of the upper container system 50. When the projecting edges 54 are mated with a corresponding opening 48 of the upper container system, the container systems are securely connected and transportable using the handle of the upper container system 22 while the planar bottom 56 of the lower container system 52 serves as the storage base of the entire organizational unit. A person of ordinary skill in the art would understand that the organizational unit is not limited to only two container systems mated together and that two or more container systems can be mated together in order to create a large organizational unit. In this case, the handle 22 of the upper most container system permits a user to easily transport or carry the entire organizational unit while the planar bottom of the lower most container system serves as the storage base for the entire organizational unit.

Figure 5:
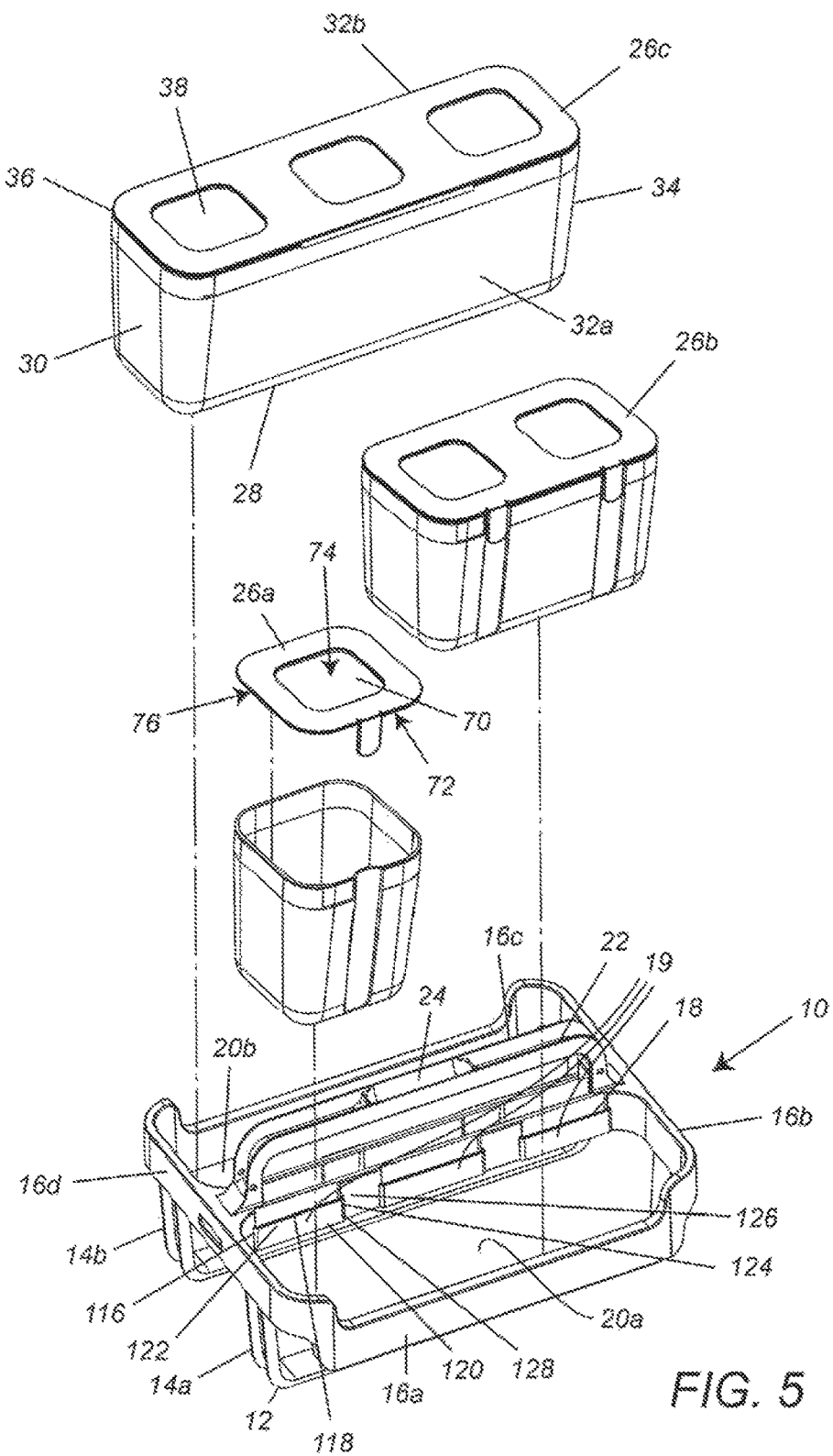
FIG. 5 depicts an exploded view of the organizational unit according to an embodiment of the disclosure.

As shown in FIG. 5 the container system includes a base portion 10. The base portion includes a planar bottom 12. The base portion includes a first end and a second end, each of which are coupled to a vertical side wall 14a and 14b. The vertical side wall 14 is coupled to horizontal side walls 16a, 16b, 16c and 16d, which define the internal space of the storage base portion 10. The base portion can assume various shapes known to persons of ordinary skill in the art by varying the length or other dimensions of the horizontal and vertical side walls, but is preferably square or rectangular in shape.

Further, as shown in FIG. 5, an interior horizontal sidewall 18 or sidewalls may be used to separate or divide the interior of the storage base portion into one or more cavities 20. In the embodiment shown in FIG. 1, the storage base portion is divided into two cavities 20a and 20b. Each cavity is defined by a planar bottom 12, vertical side walls 14 and an horizontal interior side wall 16. The planar bottom 12, vertical side walls 14 and horizontal side walls 16 and 18 can vary in dimension so as to create a more open base portion as shown or closed cavity. In other embodiments, the cavities can further be defined into smaller cavities by employing additional interiors side walls within the cavity.

A handle 22 extends from a first horizontal side wall to second horizontal side wall opposite to or facing the first horizontal sidewall. The handle is provided to allow the container system to be moved to another location by grasping a portion of the bar 24. As discussed in more detail later on, the handle portion 44 also serves to connect one container system to another.

The container system also includes one or more receptacles 26 of the same or varying sizes like those shown in 26a, 26b and 26c. The receptacles can be inserted within the storage base portion to transport the receptacles or store the receptacles. The receptacles can also be removed to access items within the receptacle or interchange them with a different receptacle. Each receptacle includes a planar bottom 28 with walls coupled to outward peripheral edges of the planar bottom 28. Specifically, the receptacle may include a first side wall 32a that is coupled to one side edge of the planar bottom 28 and a second side wall 32b is coupled to the opposite side edge of the planar bottom. Between the sidewalls is a frontwall 30 that is coupled to a front edge of the planar bottom and a backwall 34 coupled to the opposite back edge of the planar bottom. The sidewalls, planar bottom and front and back walls combine to form a receptacle with an internal storage cavity.

Included with the receptacle 26 is a cap 36 which can be attached to an upper edge of a side wall, front wall or back wall to create an enclosed receptacle. In an embodiment, the cap 36 is configured to cover and seal the opening of the receptacle 26. The cap 36 includes a panel 70 with an upper surface 74 and a lower surface 72. An edge circumvents 76 the perimeter of the panel. In an embodiment, the edge 76 has an inner wall that extends perpendicularly or substantially perpendicular downward from the plane of the panel. The inner wall is coupled to an upper wall of the edge which extends horizontally and is coupled to an outer wall that extends vertically downward from the upper wall. The outer wall is spaced apart from the inner wall to form a channel (not shown). In an example, the cap fits over the receptacle so that the top edge of the receptacle is received within the channel of the lid. In this example, the cap covers the opening of the receptacle create a closed cavity. Further to this example, the cap can easily be removed to access the cavity within the receptacle. Other mechanisms of attaching the cap to the receptacle well known to those of ordinary skill in the art can also be employed. Further, the upper surface of the cap 36 may include one or more recesses 38 which have a peripheral profile that corresponds to all or a portion of the planar bottom 12 of the storage base portion 10, the planar bottom 28 of a different receptacle, or both such that when one or more organization units are vertically stacked, the planar bottom 12 of the storage base portion 10, the planar bottom 28 of a different receptacle, or both nest with in all or a portion of the cap recess.

Further, a person of ordinary skill in the art would understand that a kit could be created using various combinations of the components described above. For example a kit could include a base portion with three different sized receptacles 58, 60 and 62 that fit within the storage base unit cavities. Separate base units could be provided such that the combination of receptacles could vary. For example, three smaller receptacles may be placed within one cavity of the storage base portion, or each base portion could include only one receptacle that extends the entire length and width of the cavity, 62.

Figure 6:
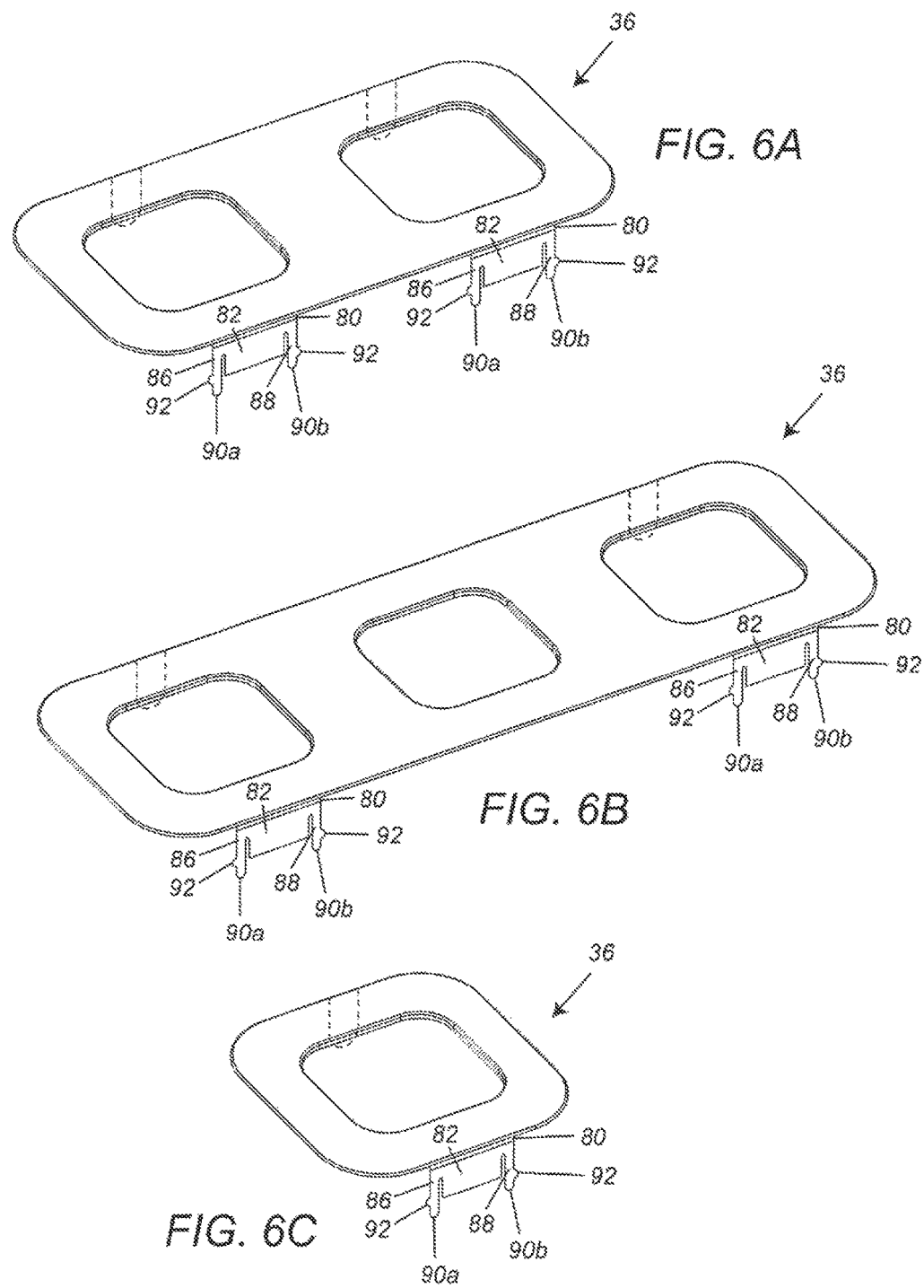
FIGS. 6A-6C depict a view of the storage receptacles and lid according to an embodiment of the disclosure.

Another embodiment of the cap 36 is shown in FIGS. 6A-6C. In this embodiment, the cap 36 is removably attached to an upper edge of a side wall, front wall or back wall of the receptacle to create an enclosed receptacle. In this embodiment, the cap can be provided with one or more hinge supports 80 equally spaced along a peripheral edge of the cap. In an example the hinge includes a flap 82 configured to be received by a slot 84 (show in FIG. 7) on a sidewall 32 of the receptacle. In an embodiment, the flap 82 includes a first tab 86 opposed to a second tab 88 each of which extend outwardly and downwardly from the flap 82. The position of each tab relative to the slot 84 is configured to provide sufficient clearance to span the width of the slot 86 and in operation allow the tabs 86 and 88 to be squeezed inwards, e.g. towards the center of the flap 82 to engage the flap 82 with the slot 84. In operation, the tabs 86 and 88 can be squeezed inwards, e.g. towards the center of the flap 82 to disengage the flap 82 from the slot 84.

In an embodiment, the flap 82 and tabs 86 and 88 are integrally formed, e.g. by injection molding. The material composition and dimensions of the tabs 86 and 88 are configured that in operation, a user can laterally displace the tabs with respect to the flap 82 with moderate force and to allow the tabs 86 and 88 to return back to their original position when then force has been released. In an example the flap and tabs are composed of a resilient material such as a plastic or resilient metal.

Figure 7:
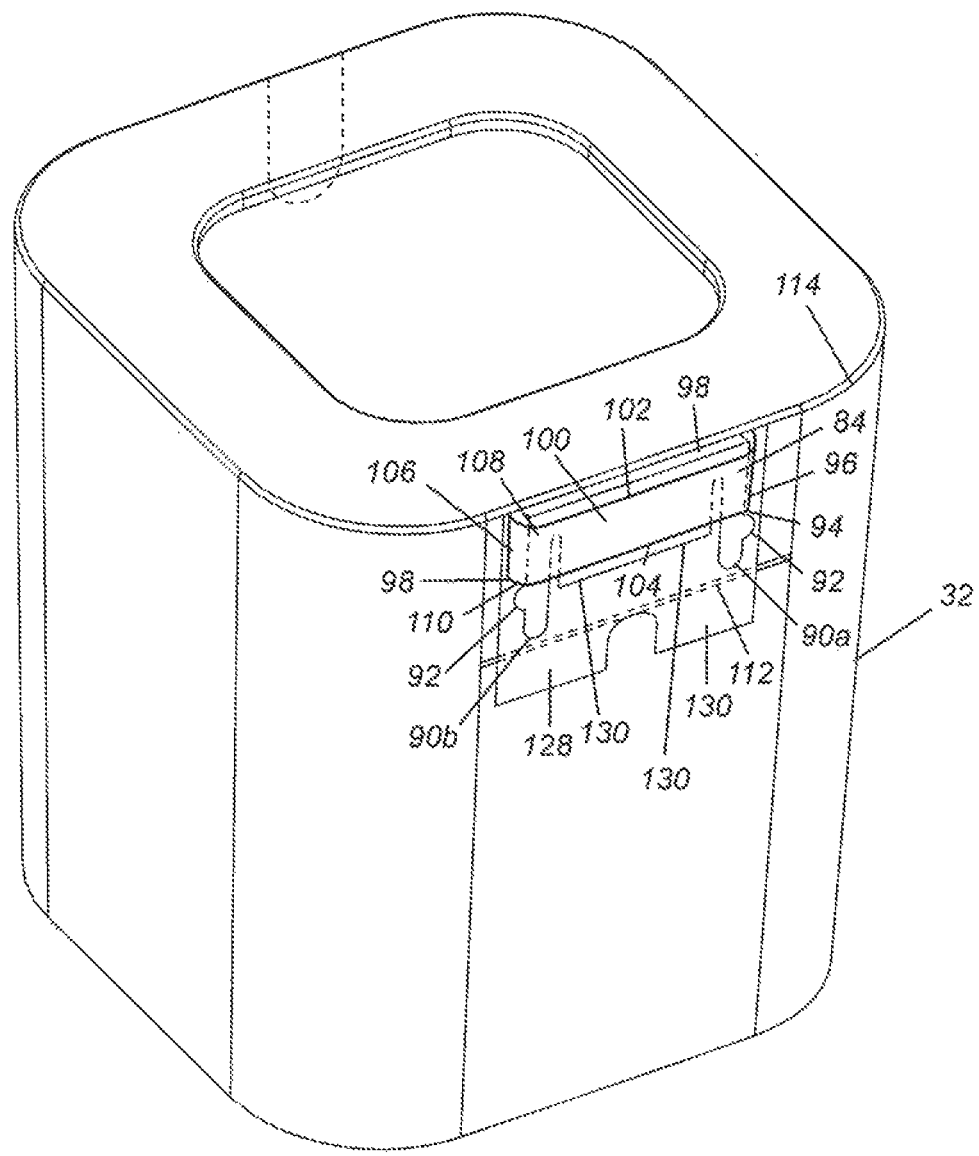
FIG. 7 depicts a view of the storage receptacle and lid according to an embodiment of the disclosure.

In an embodiment, each tab 86 and 88 has an end portion 90 that extends downwardly from each tab. In operation, as shown in FIG. 7, when each tab 86 and 88 is received within the slot 84, the end portion 90 extends past the lower edge 94 of the slot 84. In an embodiment, each tab 86 and 88 include a protrusion 92 that extends outwardly and horizontally from a peripheral edge of the tab. The position of each tab 86 and 88 and its respective protrusion 92 relative to the slot 84 are configured to provide sufficient clearance to span the width of the slot 86 and in operation allow the tabs 86 and 88 to be squeezed inwards, e.g. towards the center of the flap 82 to engage the flap 82 with the slot 84.

In an example, the material composition and dimensions of the tabs 86 and 88 are configured such that in operation, a user can laterally displace the tabs with respect to the flap 82 with moderate force and to allow the tabs 86 and 88 to return back to their original position when the force has been released. In this embodiment, each protrusion clears the lower edge 94 of the slot 84 when the tabs are squeezed inwards and when the force on the tabs is released, the tabs return to their original position such that the lower edge 94 of the slot rests on an upper edge 98 of the protrusions. In an example, the protrusion provides a locking mechanism that secures the flap and its respective tabs within the slot. In operation, when the flap and tabs are received within the slot 84, the protrusions prevent upward motion of the flap 82 and tabs 86 and 88. Further to this example, in operation, the tabs 86 and 88 can be squeezed inwards, e.g. towards the center of the flap 82 such that the tabs and protrusions are laterally displaced a dimension to have sufficient clearance of the slot to disengage the flap 82 from the slot 84.

In operation, the tabs 86 and 88 can be squeezed inwards, e.g. towards the center of the flap 82 to disengage the flap 82 from the slot 84.

As shown in FIG. 7, the receptacle can include one or more slots evenly spaced across the sidewall 32. In an embodiment, the slot 84 configured to receive the flap 82. The slot 84 includes a first slot end wall 96 extending outwardly and horizontally away from the receptacle sidewall 32 and terminating at an upper edge 98 and a lower edge 94. An edge of the first slot end wall 96 is coupled to a horizontal side wall 100, which faces the receptacle side wall 32 and extends horizontally across the sidewall 32 and terminates at an upper edge 102 and lower edge 104. The slot sidewall coupled to a second slot end wall 106 extending outwardly and horizontally away from the receptacle sidewall 32 and terminating at an upper edge 108 and a lower edge 110. A slot or opening formed within the slot end walls and horizontal side walls has an open top bounded by the top edges of the horizontal side walls and slot end walls and an open bottom bounded by the lower edges of the horizontal side walls and slot end walls is configured with suitable dimensions to receive a tab 86.

In an embodiment, the sidewall 32 of the receptacle includes a tab 112 that extends horizontally across a portion of the receptacle sidewall 32, downwards from the upper edge 114 and outward from the sidewall 32 of the receptacle sidewall 32. The position of the receptacle tab 112 relative to the slot 19 is configured to provide sufficient clearance to span the width of the slot 19 and in operation allow the tab to be inserted within the slot 19 and removed from the slot 19.

In an embodiment, the receptacle tab 112 includes a first receptacle tab portion 128 opposed to a second receptacle tab portion 130 each of which extend outwardly and downwardly from the tab 112. The position of each tab portion relative to the slot 19 is configured to provide sufficient clearance to span the width of the slot 19 and in operation allow the tab to be removably inserted within the slot 19.

In an embodiment, shown in FIG. 5, the partition wall includes one or more partition slots spaced evenly across the partition wall. The partition slot 19 includes a first slot end wall 116 extending outwardly horizontally away from the partition wall 18 and terminating at an upper edge 118 and a lower edge 120. An edge of the first slot end wall 116 is coupled to a horizontal side wall 122 which faces the partition wall 18 and extends horizontally across the partition wall 18 and terminates at an upper edge 118 and lower edge 120. The partition slot sidewall coupled to a second slot end wall 124 extending outwardly and horizontally away from the partition wall 18 and terminating at an upper edge 126 and a lower edge 128. A slot or opening formed within the slot end walls and horizontal side walls having an open top bounded by the top edges of the horizontal side walls and slot end walls and an open bottom bounded by the lower edges of the horizontal side walls and slot end walls is configured with suitable dimensions to receive a tab 112.

In an embodiment, the partition slot 19 has one or more interior walls that extend outward from the partition wall 18. The interior walls 130 (shown in FIG. 7) extend outward from the partition wall 18 relative to the horizontal side wall 122 to provide sufficient clearance of the tab 112 between the horizontal sidewall 122 and the interior wall. The interior walls 130 provide additional stability for the tab 112 when inserted within the partition slot 19. In an embodiment the interior walls can be further configured relative to the tab such that the spacing between the interior walls and the sidewalls or adjacent interior walls form a channel (not shown) sufficient to receive the tab 112, tab portion 128 and 130, or both.

Figure 8:
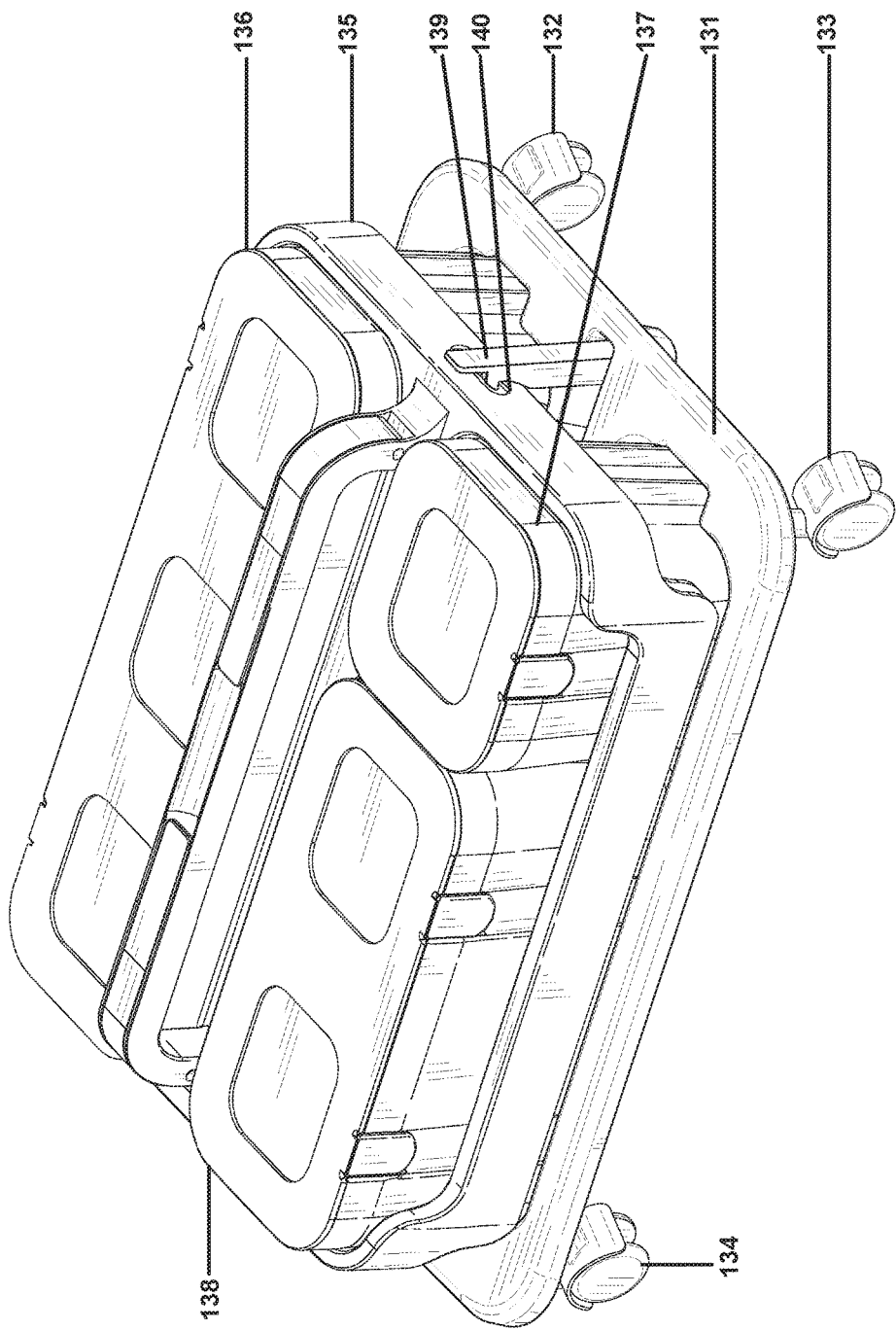
FIG. 8 is a perspective view of a platform supporting a carrying base and storage receptacles according to an embodiment of the disclosure.
Figure 11:
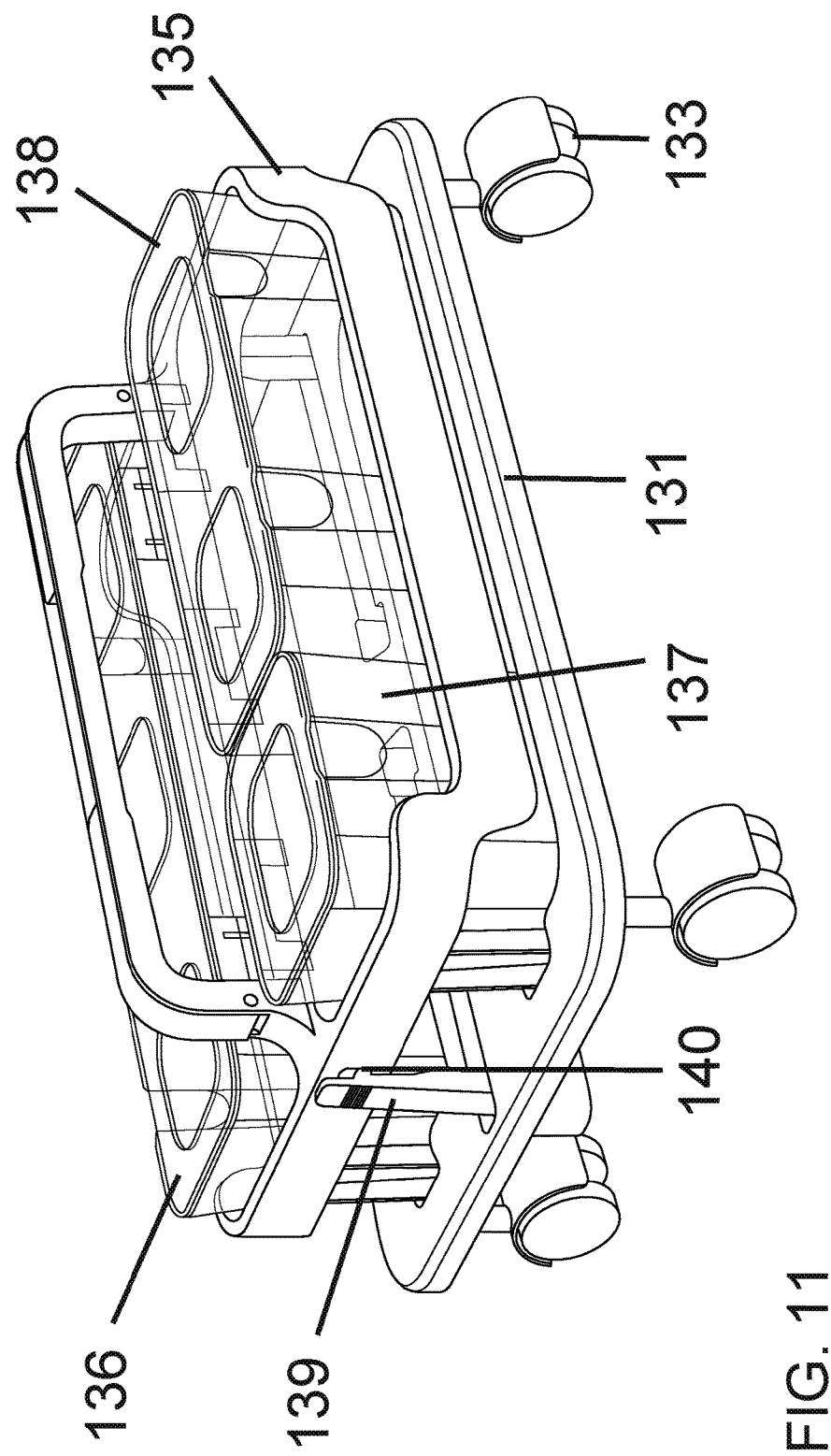
FIG. 11 is a perspective view of an embodiment of a platform supporting a storage base with a plurality of storage receptacles according to this disclosure.
Figure 14:
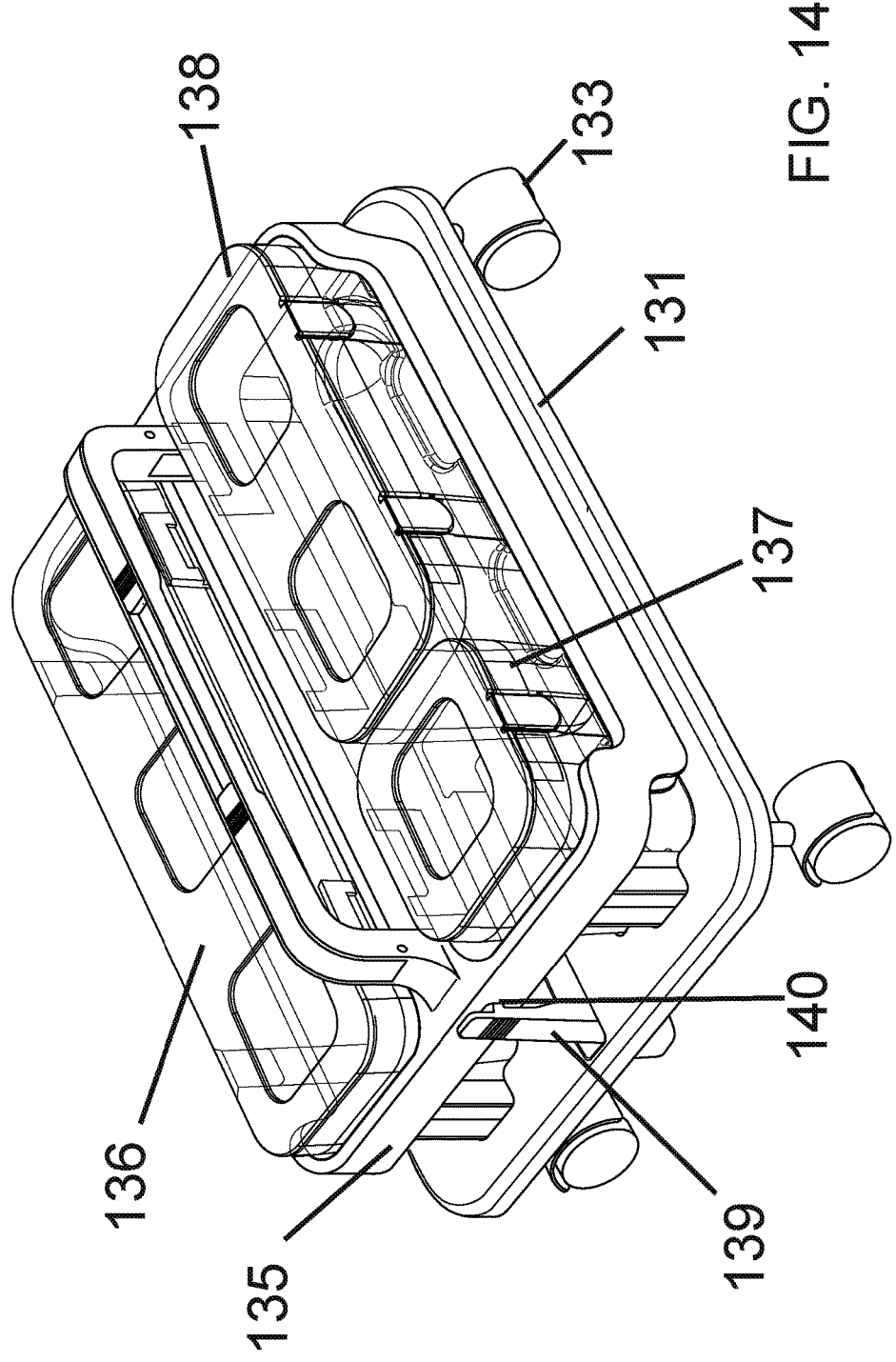
FIG. 14 is a perspective view of an embodiment of a platform supporting a storage base with a plurality of storage receptacles according to this disclosure.

Also described herein is a customizable caddy assembly that includes a platform and a storage base configured to receive interchangeable storage receptacles. FIG. 8 is a perspective view of a platform 131 according to an embodiment of the disclosure. FIG. 11 is a perspective view of an embodiment of a platform 131 supporting a storage base 135 with a plurality of storage receptacles 136, 137, 138 according to this disclosure. FIG. 14 is a perspective view of an embodiment of a platform 131 supporting a storage base 135 with a plurality of storage receptacles 136, 137, 138 according to this disclosure. Here, the platform base 131 is fitted with four removable wheels (132, 133, 134, and a fourth not shown) and supports the storage base 135. The storage base 135 in this configuration contains a single long receptacle on one side 136 and two receptacles 137 and 138 on the other side. Other configurations of the receptacles on the storage base can include six small receptacles, or four small receptacles and a medium receptacle, or three small receptacles and one large receptacle, two small receptacles and two medium receptacles, one small receptacle with a medium receptacle and a large receptacle, or two large receptacles. The platform base 131 is also equipped with means such as a tab 139 that mates with opening 140 to secure the storage base 135 to the platform 131. The tab can be similar in construction to the handle portion 44 of the storage base that serves to connect one container system to another. Each tab 139 can have a projecting edge, which can be mated with the opening 140 within the horizontal side wall of the storage base 135. When the projecting edges of tabs such as tab 139 are mated with a corresponding opening 140 of the storage base, the container system is securely connected and moveable from one place to another by either using the handle of the storage base 135 or by attachment of handles to the platform base 131 or other mechanisms for maneuvering the entire caddy assembly in upright or inclined positions. The platform can include an integrated handle or a detachable handle, or a retractable handle that can be extended for pulling or pushing the caddy assembly. In another embodiment, the platform can include a mounting mechanism to attach the container system to a vertical surface. The mounting mechanism can be a mounting bar. In an embodiment, a handle attached to the platform base can serve as the mounting mechanism. A user can use the handle to transport the container system from one place to another, and then use the handle to mount the system on to a vertical surface such as a wall or a cabinet or a door. A person of ordinary skill in the art would understand that the customizable caddy assembly can include a plurality of container systems mated together to create a large organizational unit.

Figure 9:
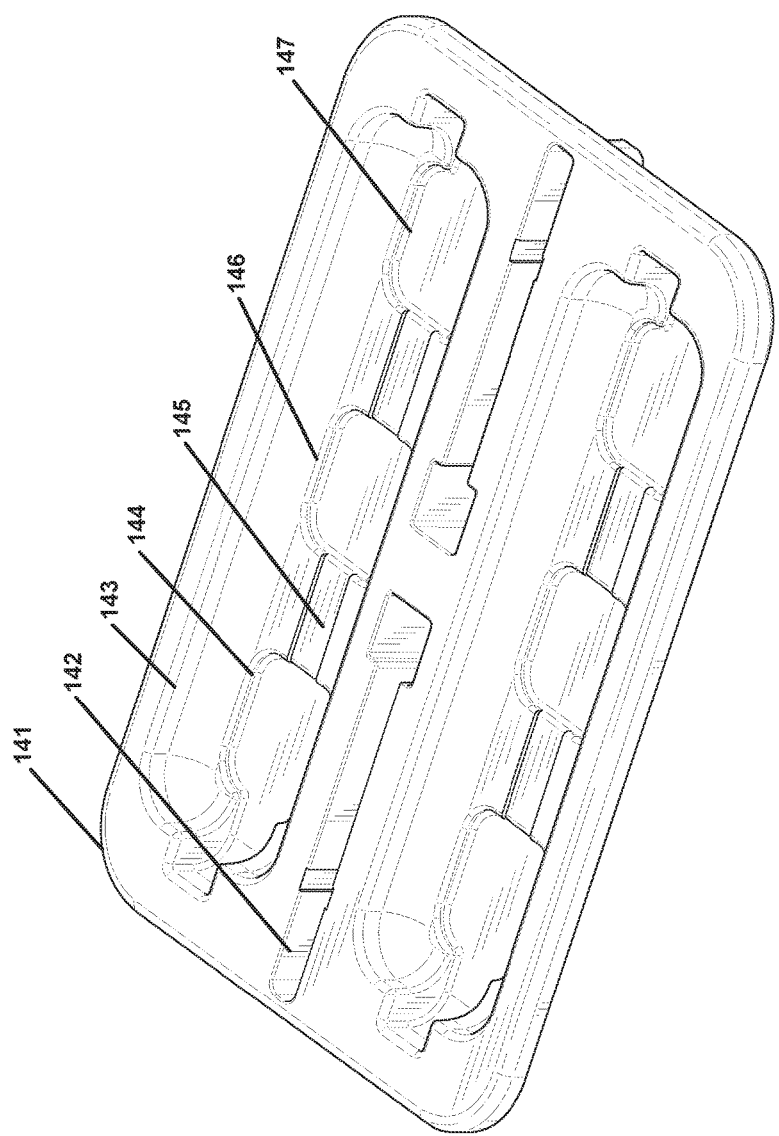
FIG. 9 is a perspective view of a platform according to an embodiment of the disclosure.

FIG. 9 is a perspective view of the top of a platform 141 according to an embodiment of the disclosure. The bottom of platform 141 has a plurality of grooves and depressions to receive the frame of a storage base. For example, the platform has grooves 143 and 144 and depressions 142, 146, and 147 to receive the frame of a storage base. In certain embodiments, grooves 143 and 144 and depressions 142, 145, and 146 removable engage the frame of a storage base through a snap-fit or other insert-slot mechanisms. Certain depressions such as 146 and 147 are designed to also accommodate the planar bottom of the receptacles. The grooves and depressions in the platform can assume various shapes known to persons of ordinary skill in the art to receive the frame of the storage base and accommodate the bottoms of the receptacles.

Figure 12:
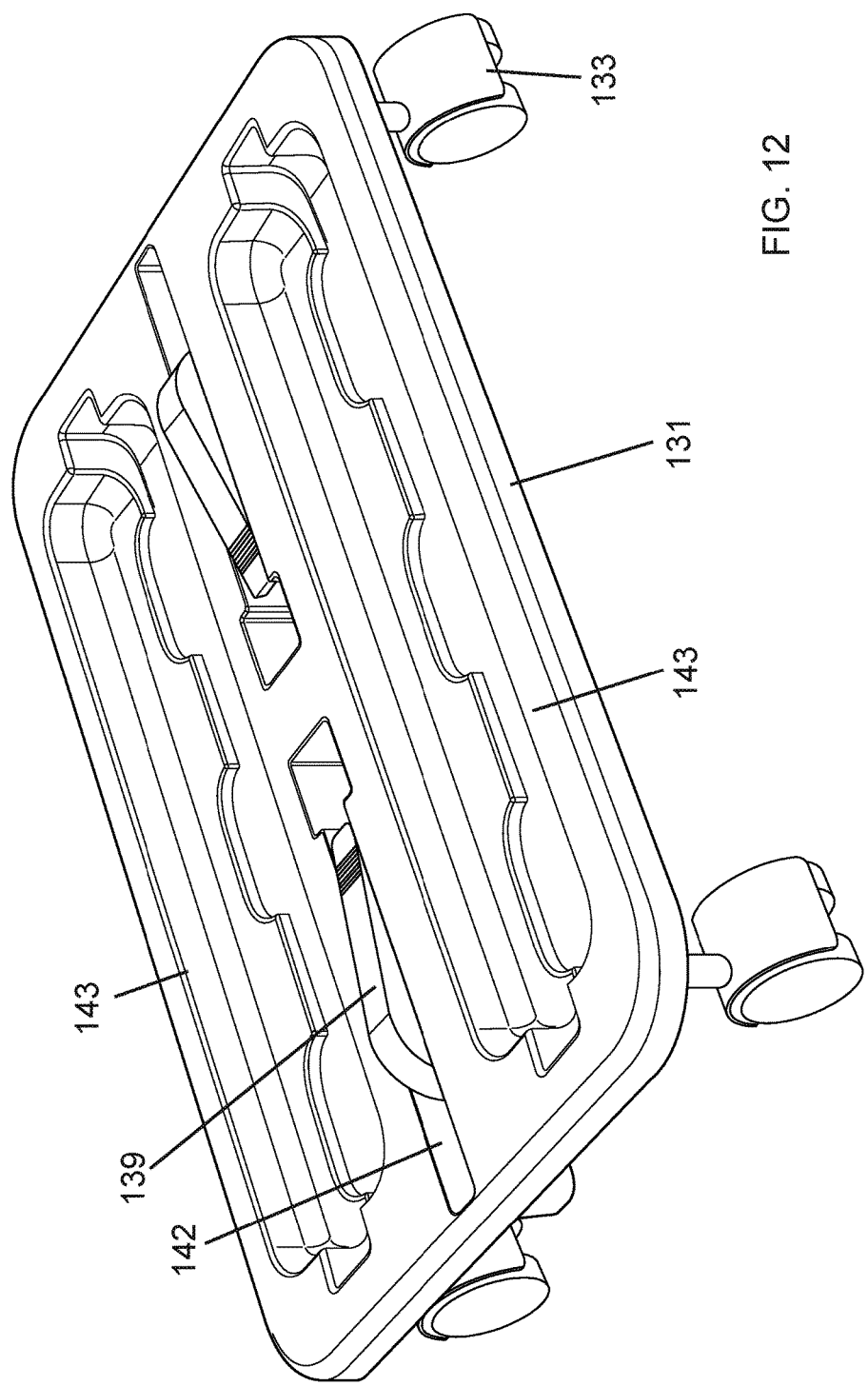
FIG. 12 is a perspective view of an embodiment of a platform with a plurality of opposing tabs in a folded down position according to this disclosure.
Figure 13:
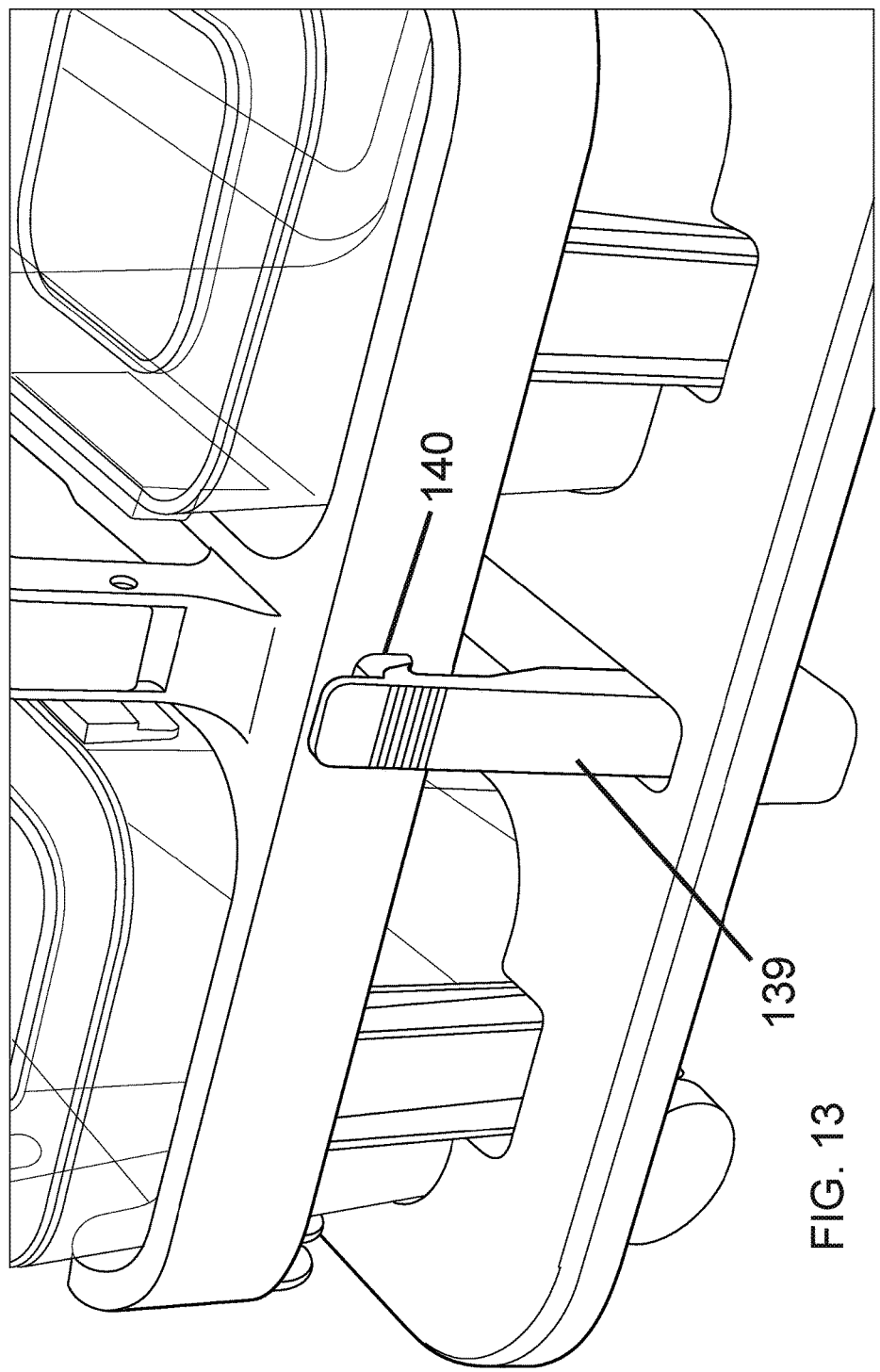
FIG. 13 is a close-up view of an embodiment of a tab pivoted into a mating position and mating with an opening of a storage base according to this disclosure.

FIG. 12 is a perspective view of an embodiment of a platform 131 with a plurality of opposing tabs 139 in a folded down position according to this disclosure. FIG. 13 is a close-up view of an embodiment of a tab 139 pivoted into a mating position and mating with an opening 140 of a storage base 135 according to this disclosure. In particular, the platform 131 defines a first longitudinal well 143 and a second longitudinal well 143 such that the first well 143 longitudinally opposes the second well 143. The platform 131 also hosts a first tab 139 including a first proximal portion and a first distal portion, where the first proximal portion is pivotally coupled to the platform 131 between the first well 143 and the second well 143 such that the first tab 139 pivots between a first lowered position (disengagement) and a first raised position (engagement) between the first well 143 and the second well 143, and where the first distal portion includes a first hook, as shown in FIG. 13. Similarly, the platform 131 hosts a second tab 139 including a second proximal portion and a second distal portion, where the second proximal portion is pivotally coupled to the platform 131 between the first well 143 and the second well 143 such that the second tab 139 pivots between a second lowered position (disengagement) and a second raised position (engagement) between the first well 143 and the second well 143, where the second distal portion includes a second hook, as shown in FIG. 13. The first tab 139 and the second tab 139 are co-aligned along a longitudinal plane common thereto, which longitudinally extends along the platform 131. As such, the first distal portion and the second distal portion are configured to move away from each other in an arcuate manner as the first proximal portion pivots from the first lowered position to the first raised position, as shown in FIG. 13, and the second tab pivots from the second lowered position to the second raised position, as shown in FIG. 13, and the first distal portion and the second distal portion are configured to move toward each other in an arcuate manner as the first proximal portion pivots from the first raised position to the first lowered position, as shown in FIG. 12, and the second proximal portion pivots from the second raised position to the second lowered position, as shown in FIG. 12. Note that as shown in FIG. 13, the first tab 139 or the second tab 139 includes a rectilinear back portion extending between a respective proximal portion and a respective distal portion. The rectilinear back portion includes a corrugated portion opposing the first hook or the second hook.

Figure 10:
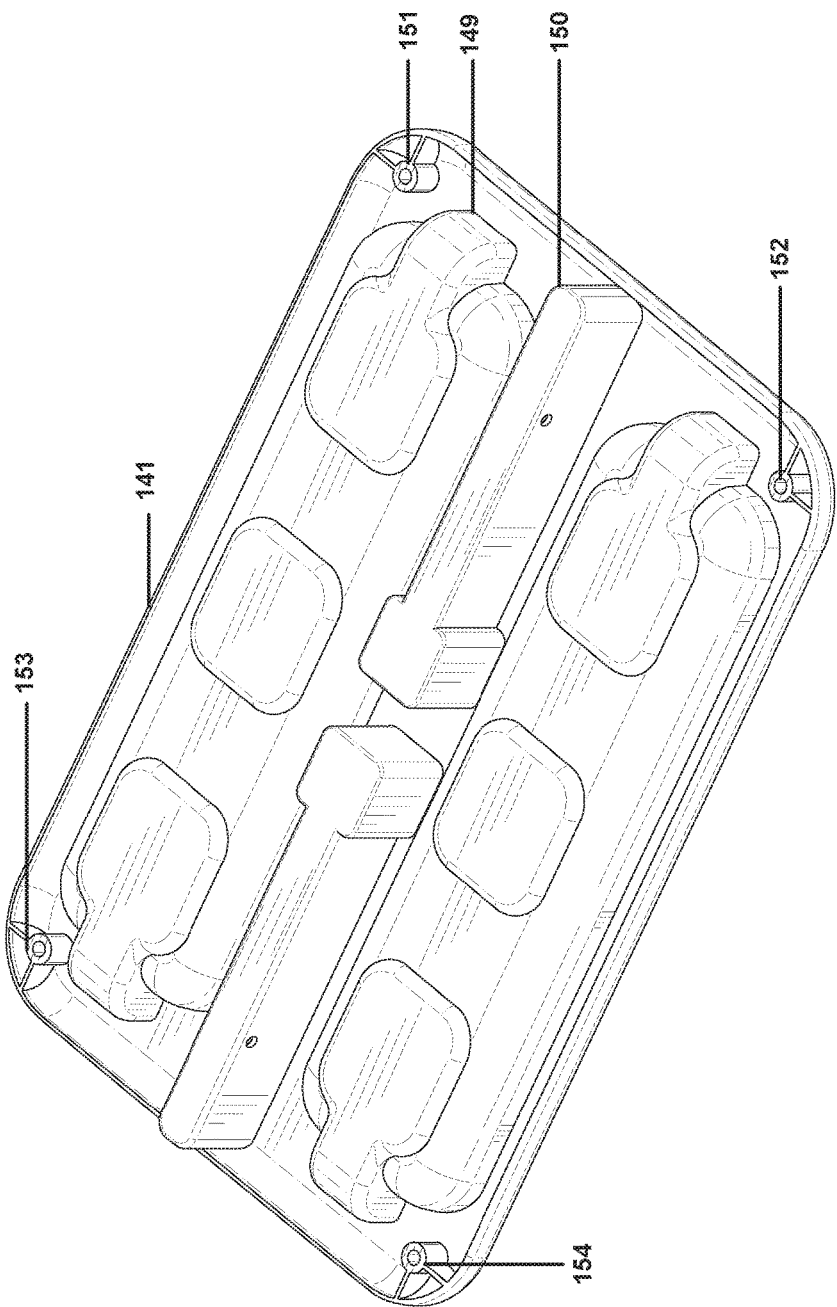
FIG. 10 is a bottom view of a platform according to an embodiment of the disclosure.

FIG. 10 is a perspective view of the bottom of a platform 141 according to an embodiment of the disclosure. The molds 149 and 150 correspond to depressions 144 and 142, as shown in FIG. 9, which are configured to receive the frame of the storage base. The slots 151, 152, 153, and 154 on the platform are configured to engage detachable moving mechanisms such as inserts with wheels. Each one of the slots 151, 152, 153, and 154 can receive an insert with a wheel, such as 132, 133, and 134 shown in FIG. 8. These wheels can have locks to prevent the platform from rolling away. Other embodiments include a platform 141 with integrated wheels instead of the detachable wheels. These wheels can be of any suitable size, shape, color, profile, width, and hardness. The wheels may be secured to the platform by a variety of mechanisms, such as screwing the wheels to appropriate slots in the platform, mounting the wheels to the platform via a bolt and a lug nut, and mounting the integrated wheels to the platform utilizing a single common axle. In an embodiment, adjacent slots such as 151 and 152 can be fitted with inline-skate wheel mechanisms, where the inserts that fit into slots 151 and 152 have a line of small wheels that increase mobility of heavier container systems. Adjacent slots such as 153 and 154 can also be similar fitted in this embodiment.

While various embodiments of the present disclosure have been described, it will be apparent to those of skill in the art that many more embodiments and implementations are possible that are within the scope of this disclosure. Accordingly, the present disclosure is not to be restricted except in light of the attached claims and their equivalents.

What is claimed is:

1. A device comprising:
a platform defining a first well and a second well therein such that the first well opposes the second well, wherein the platform includes an upper surface;
a first tab including a first proximal portion and a first distal portion, wherein the first proximal portion is pivotally coupled to the platform between the first well and the second well such that the first tab pivots between a first lowered position and a first raised position between the first well and the second well, wherein the first distal portion includes a first hook, wherein the first tab longitudinally extends between the first proximal portion and the first distal portion along the upper surface in the first lowered position, wherein the first tab longitudinally extends between the first proximal portion and the first distal portion substantially perpendicular to the upper surface in the first raised position; and
a second tab including a second proximal portion and a second distal portion, wherein the second proximal portion is pivotally coupled to the platform between the first well and the second well such that the second tab pivots between a second lowered position and a second raised position between the first well and the second well, wherein the second distal portion includes a second hook, wherein the second tab longitudinally extends between the second proximal portion and the second distal portion along the upper surface in the second lowered position, wherein the second tab longitudinally extends between the second proximal portion and the second distal portion substantially perpendicular to the upper surface in the second raised position,
wherein the first distal portion and the second distal portion are configured to move away from each other as the first proximal portion pivots from the first lowered position to the first raised position and the second tab pivots from the second lowered position to the second raised position,
wherein the first distal portion and the second distal portion are configured to move toward each other as the first proximal portion pivots from the first raised position to the first lowered position and the second proximal portion pivots from the second raised position to the second lowered position.

2. The device of claim 1, wherein the first tab and the second tab are co-aligned along a plane common thereto.

3. The device of claim 1, wherein at least one of the first tab or the second tab includes a rectilinear portion extending between a respective proximal portion and a respective distal portion.

4. The device of claim 1, further comprising:
a storage base including a sidewall defining an opening therein, wherein at least one of the first tab or the second tab includes a projection configured to engage with the opening such that the storage base is coupled to the platform when the at least one of the first tab or the second tab is in at least one of the first raised position or the second raised position, respectively.

5. The device of claim 4, further comprising:
a storage receptacle resting within the storage base above at least one of the first well or the second well, wherein the sidewall extends along the storage receptacle.

6. The device of claim 5, wherein the sidewall is a first sidewall, wherein the storage receptacle includes a second sidewall including a transparent area.

7. The device of claim 5, wherein the sidewall is a first sidewall, wherein the storage receptacle includes a second sidewall and a cap, wherein the second sidewall includes a slot, wherein the cap includes a flap, wherein the slot is configured to receive the flap such that the cap can move with respect to the second sidewall.

8. The device of claim 7, wherein the flap includes a plurality of elongated tabs extending away from the cap.

9. The device of claim 8, wherein the elongated tabs are squeezable towards each other.

10. The device of claim 8, wherein at least one of the elongated tabs includes a projection extending lateral to the elongated cap, wherein the projection is configured to engage the slot such that the flap is secured to the slot and the cap can move with respect to the second sidewall.

11. The device of claim 7, wherein the cap includes a tongue, wherein the storage receptacle includes a third sidewall including a channel therein, wherein the tongue is configured to extend within the channel when the cap closes the storage receptacle.

12. The device of claim 4, wherein the storage base includes a handle extending over the platform between the first well and the second well, wherein the handle defines a groove, wherein the groove includes an upper edge, wherein the handle includes a handle portion, wherein the handle portion is pivotally attached to the handle such that the handle portion is configured to (1) lie flush with the upper edge when received within the groove and (2) pivot about a fixed point to a substantially 90degree angle with respect to the handle.

13. The device of claim 12, wherein the storage base is a first storage base, wherein the projection is a first projection, wherein the opening is a first opening, wherein the handle portion includes a second projection configured to engage with a second opening of a second storage base such that the second storage base is coupled to the first storage base when the handle portion is at the substantially 90 degree angle with respect to the handle and such that the second storage base is stacked on the first storage base when the first storage base is positioned between the platform and the second storage base.

14. The device of claim 1, further comprising:
a plurality of wheel assemblies supporting the platform and detachable from the platform.

15. The device of claim 1, further comprising:
a plurality of wheel assemblies supporting the platform and integrated with the platform.

16. The device of claim 1, further comprising:
a plurality of inline wheel assemblies coupled to the platform.

17. The device of claim 1, wherein at least one of the first tab or the second tab includes a ridged portion between at least one of the first proximal portion and the first distal portion or the second proximal portion and the second distal portion, respectively.

18. The device of claim 17, wherein the at least one of the first tab or the second tab includes a projection that opposes the ridged portion.

19. The device of claim 1, wherein at least one of the first tab or the second tab extends into the platform in at least one of the first lowered position or the second lowered position, respectively.

20. The device of claim 1, wherein at least one of the first tab or the second tab is colored to be visually distinct from the platform.

21. The device of claim 1, wherein the platform defines a third well and a fourth well, wherein the third well and the fourth well are positioned between the first well and the second well, wherein the third well and the fourth well oppose each other, wherein the third well receives the first tab when the first tab is in the first lowered position, wherein the fourth well receives the second tab when the second tab is in the second lowered position.

* * * * *